INVENTORS: FERD R. ANDERHOLM
FRANCIS A. GOPLEN

BY Richard H. Smith
ATTORNEY

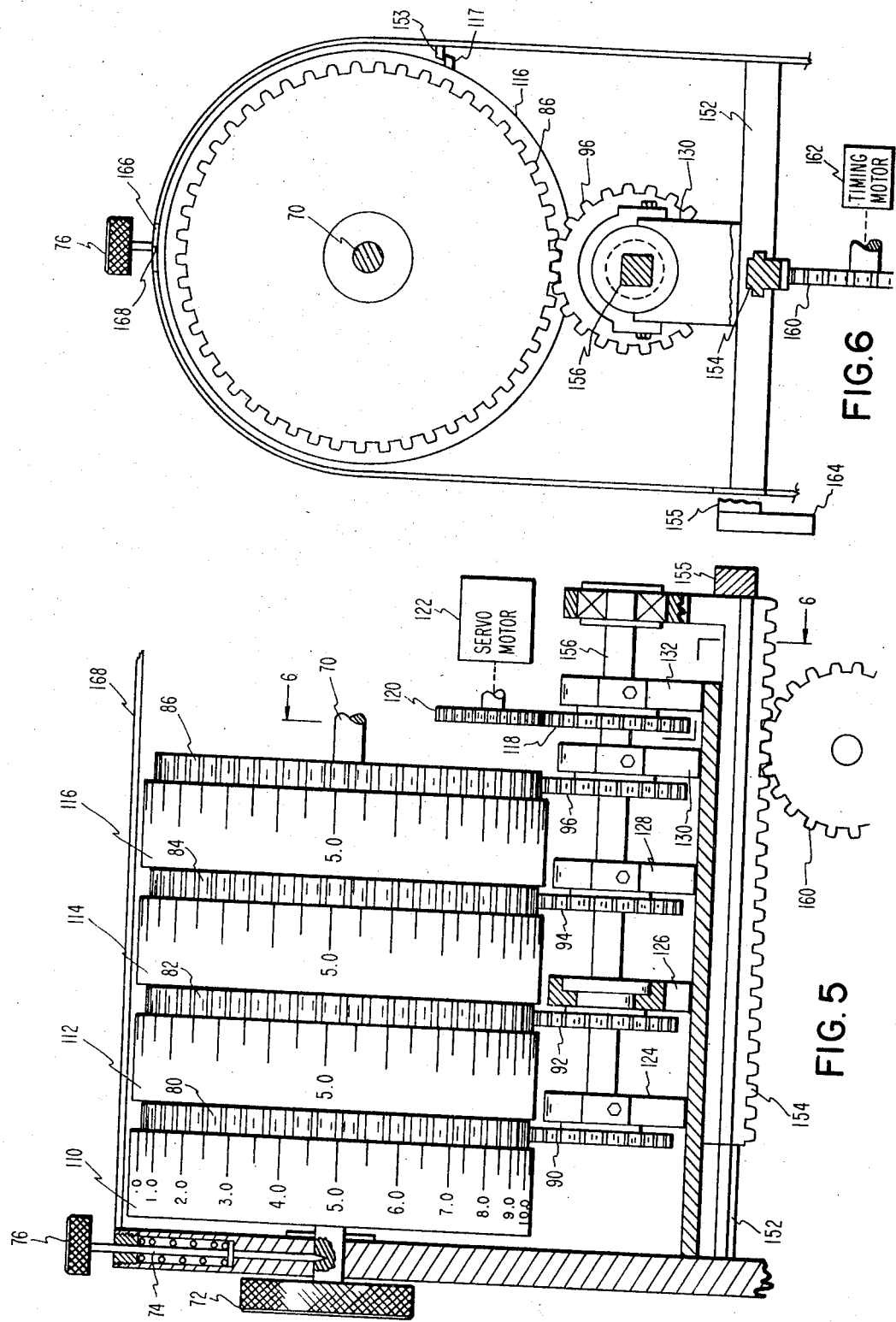

3,451,056
MOVABLE INDICATOR DISPLAY UNIT
Ferd R. Anderholm, Rochester, and Francis A. Goplen, Zumbrota, Minn., assignors to International Business Machines Corporation, Armonk, N.Y., a corporation of New York
Filed Jan. 6, 1967, Ser. No. 607,795
Int. Cl. G08b 5/30
U.S. Cl. 340—378                                      10 Claims

ABSTRACT OF THE DISCLOSURE

Both current and recorded past readings of a variable are displayed by a plurality of indicators which are rotatable about a common axis. In the first embodiment described, a square drive shaft engaging pivotable indicating sectors through a square opening provided at the pivot centers thereof is rotated by a servo motor in accordance with the variable to be displayed. A timing motor drives the shaft axially whereby the indicators are sequentially disengaged from the servo. Disengaged indicators thus display a record of past readings while those still engaged display the current reading. In the second embodiment, rotatable drum indicators are driven by separate drive pinions which in turn are engaged by the square shaft.

Background of the invention

This invention relates to a display unit and, more particularly, to a display unit whch is adapted to record and display past readings of a variable as well as to provide current readings thereof.

Display units adapted to both display and record the state of a variable generally take the form of some type of movable indicator which is provided with a scribing device for the purpose of marking a movable chart. The indicator thus provides a current reading of the variable and the line drawn on the chart represents the history of the variable over some previous time interval.

These types of devices tend to be rather high in cost. Further, the complexities involved in reading the graph-like recording as well as in periodically replacing the recording chart and ink supply associated with the scribing unit make these devices difficult for an unskilled, untrained operator to use.

Objects and summary of the invention

It is an object of the invention to provide an improved display unit which is adapted to record the past history of a variable as well as to provide current readings thereof.

Another object is to provide a recording display unit that does not employ charts, graps, scribing units, ink supplies or the like.

Still another object is to provide a recording display unit that is easy to read, simple to operate, reliable in operation and extremely low in cost.

In accordance with the principles of the invention, a recording display unit is provided with a plurality of easily readable indicators which are adapted to be driven by a servomechanism such that the indicators represent the current state of the variable being displayed. Further means are provided for sequentially disconnecting the indicators from the servomechanism at a predetermined rate of time whereby each disconnected indicator represents a recording of the state of the variable at the time of disconnection. Thus, the unit provides current readings as well as the past history of the displayed variable. Simply operable manual reset means are provided to restore the unit back to the start condition whereby the unit is placed into condition for re-use.

The foregoing and other objects, features and advantages of the invention will be apparent from the following more particular description of preferred embodiments of the invention, as illustrated in the accompanying drawings.

Brief description of the drawings

FIG. 5 is a front elevation view, partially sectioned, of a second embodiment of the invention.

FIG. 6 is a side elevation sectional view taken along the line 6—6 of FIG. 5.

Description of the preferred embodiments

Figure 1:
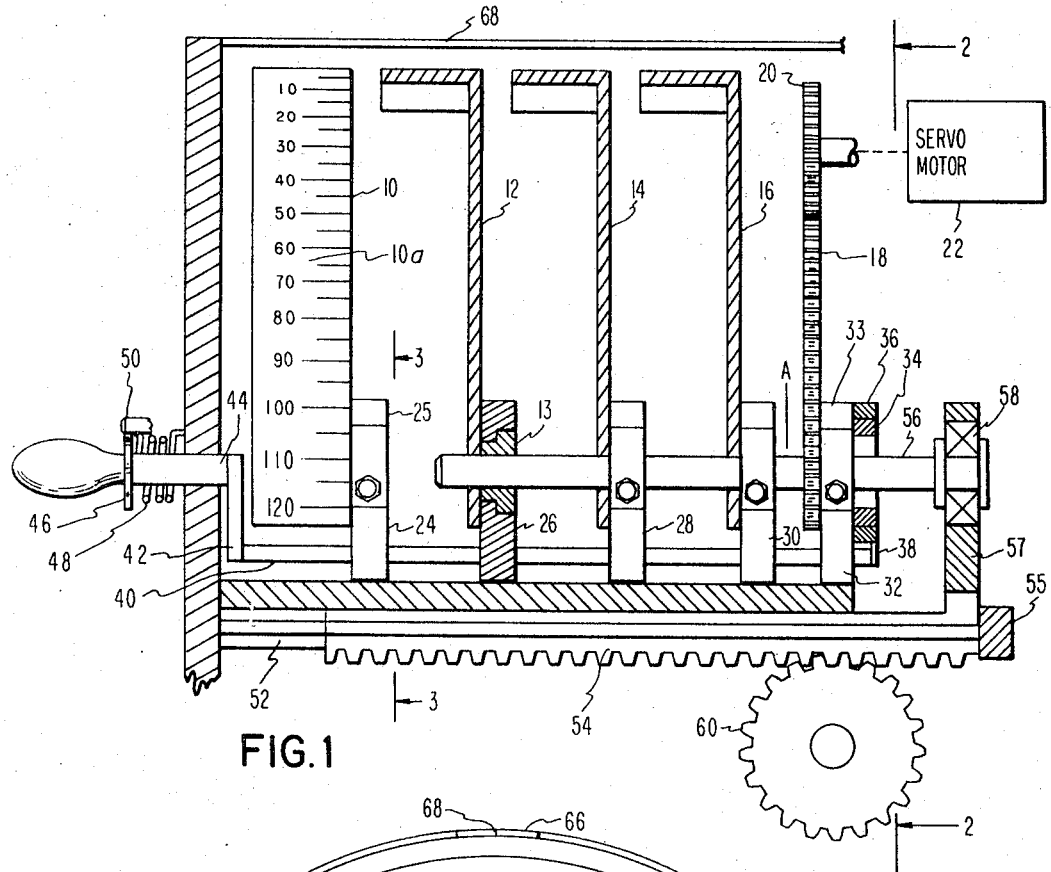
FIG. 1 is a front elevation view, partially sectioned, of a first embodiment of the invention.
Figure 2:
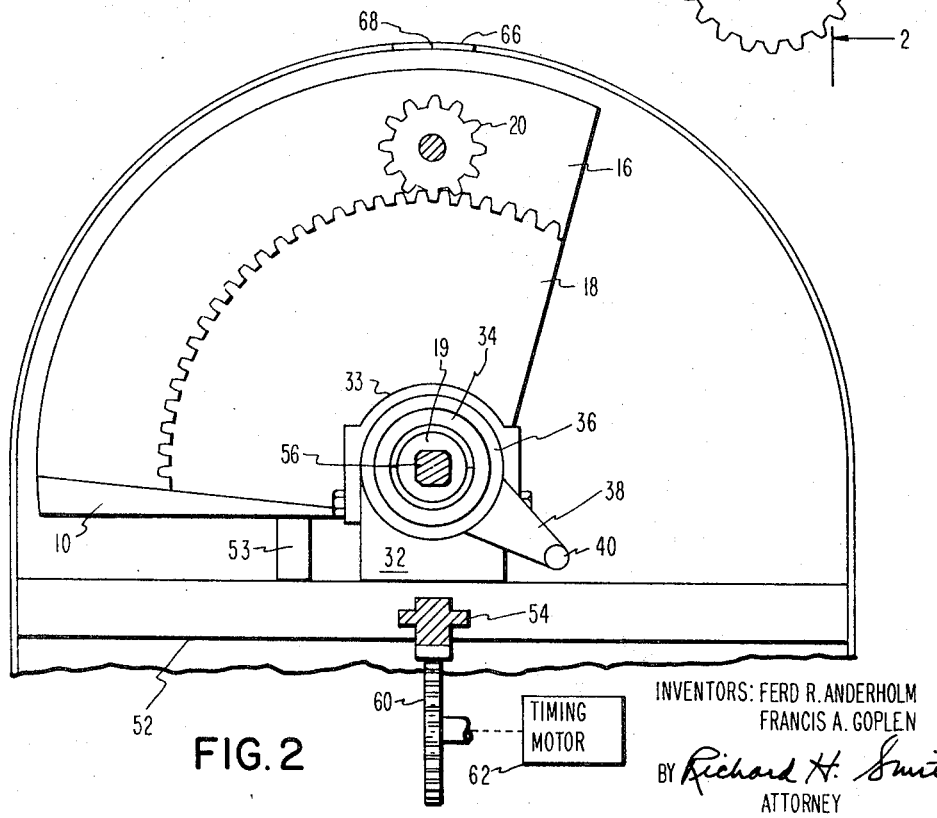
FIG. 2 is a side elevation sectional view taken along the line 2—2 of FIG. 1.

Referring to FIGS. 1 and 2, a detailed description of the first embodiment of the invention is hereinafter given. A plurality of indicating sectors 10, 12, 14 and 16 are pivotally journaled in bearing pedestals 24, 26, 28 and 30, respectively. The pedestals are mounted on a support member 52 which is connected to the frame of the unit. Each sector bears a calibrated scale, such as the scale 10a on sector 10, on a flange about its arcuate periphery. A portion of each scale is visible through a window 66 in the top cover of the unit. A hairline 68 is centrally positioned along the length of the window and serves as the reference line for reading each of the scales.

A bearing drum, such as the drum 13 illustrated for sector 12, is rigidly connected to each sector and pivotally supports the sector in its bearing pedestal. The drum is flanged to prevent axial movement of the sector. Each drum engages its respective bearing pedestal in a slight interference fit for purposes to be described subsequently.

Figure 3:
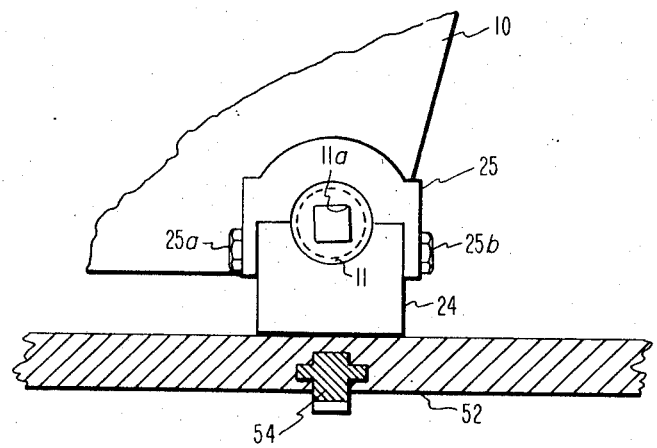
FIG. 3 is a sectional view taken along the line 3—3 of FIG. 1.

As shown in the sectional view of FIG. 3, bearing pedestal 24 includes a top section 25 detachably connected by means of screws 25a and 25b. Section 25 permits insertion and removal of the bearing drum 11 connected to sector 10. Each of the remaining bearing pedestals is similarly constructed. As shown, the drum 11 has a centrally located square aperture 11a. The remaining bearing drums have similar apertures.

Referring back to FIGS. 1 and 2, a fifth bearing pedestal 32 pivotally supports a sector gear 18 by means of flanged bearing drum 19. Drum 19 is supported in a clearance fit rather than an interference fit to permit relatively friction-free pivoting of sector gear 18.

A pinion 20 cooperates with sector gear 18 and is driven by a servomotor 22, which rotatably responds in a conventional manner to the variable to be displayed.

Support member 52 slidably supports a rack 54 positioned beneath the bearing pedestals. A square shaft 56 is rotatably supported by a bearing 58 which is mounted in a vertical extension 57 projecting upwardly from the right-hand end of rack 54. When rack 54 is positioned all the way to the left, shaft 56 extends through the square apertures of the bearing drums associated with all of the indicating sectors and the sector gear 18. It is readily seen that when pinion 20 pivots sector gear 18, a corresponding pivotal motion is transmitted by shaft 56 to each of the indicating sectors. In this condition, all sectors provide a current reading of the variable.

A pinion 60 cooperates with rack 54 and is driven by a timing motor 62 in a clockwise (FIG. 1) direction. The rotation of pinion 60 may be constant or incremental as preferred. As pinion 60 rotates, it drives rack 54 and shaft 56 to the right whereby the indicating sectors 10, 12, 14 and 16 are sequentially disengaged from shaft 56. Since each indicating sector, as mentioned above, is journaled in an interference fit in its respective bearing pedestal, it remains, after disengagement from shaft 56, in the angular position it occupied at the instant of disengagement. Thus each disengaged indicating sector thus represents a recordation of the state of the variable at a different discrete point in time. All indicating sectors which at any given time are still engaged with shaft 56 of course provide a current reading of the variable.

A manually operable reset bail 40 is provided for the purpose of resetting the indicating sectors, sector gear 18 and servomotor 22 back to their zero or home positions when it is desired to begin a new recording interval. Bail 40 runs parallel to the axis of rotation of the sectors and is supported to rotate about that axis by a pair of arms 42 and 38. Arm 42 is connected to a shaft 44 journalled in the left side panel of the unit. A manually operable crank arm 46 is connected to the outer end of shaft 44. Arm 38 is connected to a bearing ring 36 which rotates on a collar 34 rigidly connected to bearing pedestal 32.

Figure 4:
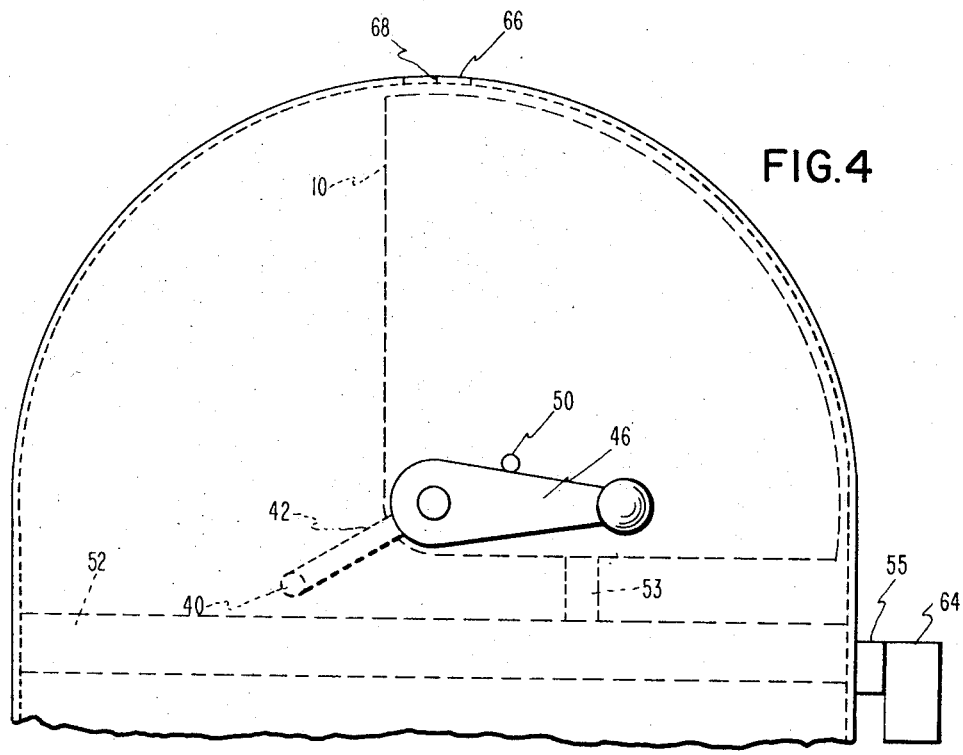
FIG. 4 is a side elevation view of the embodiment of FIG. 1 and shows the two manually operable reset handles.

Resetting of the device is accomplished by grasping the handle connected to crank arm 46 and rotating the arm approximately 120° clockwise (FIG. 4). The indicating sectors and sector gear 18 are returned under the counterclockwise (FIG. 2) urging of bail 40 until they are arrested in their home positions by a limit bar 53. Arm 46 is then allowed to return to its home position established by a stop 50. The arm is normally kept in this position by a torsion spring 48 (FIG. 1).

Restoration of the sectors to their home positions places the square openings in the bearing drums in alignment with square shaft 56. In order to assure this alignment, timing pinion 60 can drive the left end of shaft 56 to the right no farther than point A of FIG. 1. Resetting of shaft 56 is thus accomplished through sector gear 18.

After the sectors have been reset, rack 54 is manually returned to its far left position to complete the resetting operation. This is done by means of an arm 55 which is connected to the right end of rack 54 and extends outwardly through a slot in the front cover of the unit. A handle 64 (FIG. 4) is connected to arm 55 to facilitate this restoring operation. The handle 64 also provides an andication of the relative position of rack 54 at any time during a measurement interval. This enables the operator to know which of the indicating sectors have been disengaged from shaft 56, and thus display past readings, and which of the sectors are still engaged with the shaft and thus display the current reading.

In summary, operation of the device is as follows. Before starting a measurement interval, the operator makes sure the device is fully restored by operating reset crank 46 to return the sectors to home and by operating handle 64 to move rack 54 to its far left position. Thereafter, the servomotor 22 and timing motor 62 are started. The former pivots the indicating sections 10, 12, 14 and 16 to display the state of the variable parameter which drives motor 22. At the same time, motor 62 gradually drives rack 54 (FIG. 1) to the right at a predetermined rate whereby the indicating sectors are sequentially disengaged from shaft 56. Once disengaged, an indicating sector ceases representing the current state of the variable and provides a recorded representation of the state of the variable at the instant of disengagement.

To facilitate interpretation of the information represented collectively by the plural indicating scales, a removable strip (not shown) is provided on the top cover adjacent and running parallel to the viewing window 66. Appropriate information is written on the strip to indicate the point in time at which each of the different sectors is disengaged from shaft 56. This, of course, is determined by the time rate established by motor 62. Thus by reading each scale, using hairline 68 as the reference point, the operator quickly and easily obtains the desired data.

Referring to FIGS. 5 and 6, a detailed description of the second embodiment of the invention is hereinafter given. Basically, the second embodiment operates the same as the first embodiment except that rotatable indicating drums 110, 112, 114 and 116 are substituted in place of the pivotable indicating sectors. The drums 110, 112, 114 and 116 are mounted to rotate about a normally stationary shaft 70 journalled between the side panels of the unit. Shaft 70 is normally held stationary by a spring-loaded detent pin 74 contained in the left-hand side panel. The drums should be appropriately shimmed on the shaft 70 so that rotation of one drum does not impart rotation to the adjacent drums. Each drum engages the shaft in a slight interference fit so that when the driving influence of square drive shaft 156 is removed, the drum remains stationary on the shaft in the position it occupied at the instant of disengagement.

The drums are provided with drive gears 80, 82, 84 and 86. The drive gears cooperate with four drive pinions 90, 92, 94 and 96 which are journalled in the bearing pedestals 124, 126, 128 and 130, respectively. The bearing pedestals are supported on horizontal support member 152 and are constructed in the same manner as the pedestals 24, 26, 28 and 30 previously described. Each of the drive pinions is rotatably journalled in its respective bearing pedestal by means of a flanged bearing drum. Each of the bearing drums cooperates with its pedestal in a clearance fit so that the drive pinions rotate in a relatively friction-free fashion. Each bearing drum has a square central opening to permit engagement with square drive shaft 156.

A fifth bearing pedestal 132 rotatably supports a drive pinion 118 which cooperates with a servo driven input pinion 120. A servomotor 122, which is identical to the motor 22 previously described, drives the pinion 120 in response to the variable to be displayed.

A rack 154 is slidably mounted in support member 152 and cooperates with a timer gear 160 to move drive shaft 156 to the right. Gear 160 is driven by a timing motor 162 which is identical to the timing motor 62 described previously. A reset handle 164 is connected to the rack by arm 155 which extends through a slot in the front panel of the unit.

Reset of the drums and shaft 156 is permitted by lifting upwardly on a button 76 whereby detent pin 74 is drawn out of engagement with the shaft 70. A reset knob 72 is then manually rotated to turn the shaft 70 counterclockwise (FIG. 6) whereby each of the indicating drums is rotated, by virtue of its friction connection to shaft 70, until a pin 117 on the drum contacts a home position limit stop 153 projecting from the back panel of the unit. The shaft 156 and gears 118 and 120 are restored to their home positions by virtue of the rotation imparted to drive pinion 96 when drum 116 is restored.

It is to be noted that shaft 156 cannot be drawn so far to the right that it becomes disengaged from drive pinion 96. Appropriate limit means (not shown) are provided to appropriately limit the movement of rack 154. It can thus be appreciated that drum 116 will never be disengaged from shaft 156 and will always provide a current reading of the variable.

Operationally, the second embodiment is virtually identical to the first embodiment. Each indicating drum is rotated by its respective drive pinion under the influence of the servomotor so long as the drive pinion remains in engagement with shaft 156. The timing motor drives shaft 156 to the right to sequentially disconnect the indicating drums at a predetermined rate of time, thus converting the drums from indicators of current readings to indicators of past readings, just as with the indicating sectors of the first embodiment. A viewing window 166 and hairline 168 are provided at the top of the unit to enable reading of the data presented by the scales on the drums.

To reset the unit, the operator first lifts up detent pin 74 and rotates shaft 70 by manipulating knob 72, counterclockwise (FIG. 6), until the pin 117 on each of the indicator drums engages its limit stop 153. The operator then restores rack 154 to its left-most position by manipulating the handle 164.

It is to be understood that while both embodiments of the invention have been shown and described as having only four indicating positions, a much larger number of indicators is desirable in most applications of the invention. Up to forty or fifty indicating positions would appear to be easily operable in accordance with the structure shown and described. Also, to render the device adaptable to fully automatic operation, electromagnetic or other automatically controllable means may be provided to operate the restoring mechanisms.

It may also be desirable to provide the drive shafts 56 and 156 with a non-symmetric cross-sectional shape so that the openings in the pedestal supported bearing members align with the shaft only when the indicators are in their home position. This would prevent any possibility of resetting the shafts to their left-most position without first resetting the indicators to home. It should also be realized that the timing motor need not always be operated at a predetermined rate. In certain applications it is desirable to disengage the indicators from the servomotor in accordance with some non-constant parameter. For example, the servomotor may be driven to respond to a line voltage while the timing motor is incrementally advanced one position each time some failure of a machine function is detected. The indicators thus record the line voltage at the time of each different failure, the time of the failure being recorded by a separate instrument or not at all, depending on its significance to the analysis being made.

We claim:
1. In a display unit, the combination comprising:
a plurality of movable indicators;
means for moving said indicators in correspondence with a variable to be displayed; and
disengaging means for disengaging said moving means from said indicators sequentially, whereby each disengaged indicator represents the state of said variable at a different point in time.
2. The display unit set forth in claim 1 wherein said indicators comprise:
a plurality of sectors pivotable about a common axis and constrained so as to remain stationary when acted upon by the force of gravity alone.
3. The display unit set forth in claim 2 wherein said moving means comprises:
a servomotor driven in response to said variable;
a central shaft connected to said indicating sectors through non-circular apertures at the pivot axes thereof, said shaft being rotatable about said axis and linearly movable along said axis; and
gearing means interconnecting said servomotor and said shaft whereby said shaft pivots said sectors in accordance with the movement of said motor.

4. The display unit set forth in claim 3 wherein said disengaging means comprises:
a timing motor for moving said central shaft along said pivot axis at a predetermined rate, whereby said shaft is drawn through said apertures and is thus sequentially disengaged from said indicating sectors.
5. The display unit set forth in claim 1, further comprising:
reset means for moving said indicators and said moving means to a home position.
6. The display unit set forth in claim 4, further comprising:
first reset means for pivoting said sectors and said central shaft to a home position; and
second reset means operable after said first reset means to move said central shaft through said apertures whereby each sector is reconnected to said servomotor.
7. The display unit set forth in claim 1 wherein said indicators comprise:
a plurality of cylindrical drums rotatable about a stationary shaft, said drums being rotatably constrained so as to remain stationary when acted upon by the force of gravity alone.
8. The display unit set forth in claim 7 wherein said moving means comprises:
a servomotor driven in response to said variable;
a gear connected to each said cylindrical drum;
a drive pinion meshing with each said gear, said pinions being rotatable about a common axis;
a central shaft rotatable about said axis and connected to each said pinion through a noncircular central aperture therein; and
gearing means interconnecting said servomotor and said shaft whereby said shaft rotates said drums in accordance with the movement of said motor.
9. The display unit set forth in claim 8 wherein said disengaging means comprises:
a timing motor for moving said central shaft along said common axis at a predetermined rate, whereby said shaft is drawn through said apertures and is thus sequentially disengaged from said drive pinions.
10. The display unit set forth in claim 9, further comprising:
first reset means for rendering said stationary shaft rotatable to permit rotation of said drums and said central shaft to a home position; and
second reset means operable after said first reset means to move said central shaft through said apertures, whereby each drum is reconnected to rotate with said servomotor.

References Cited
UNITED STATES PATENTS 2,419,394  4/1947  Erhard _____ 340—378 X
3,199,097  8/1965  Hartley _____ 340—324

JOHN W. CALDWELL, *Primary Examiner.*

H. I. PITTS, *Assistant Examiner.*

U.S. Cl. X.R.
340—309.4, 324